Figures 1, 2:
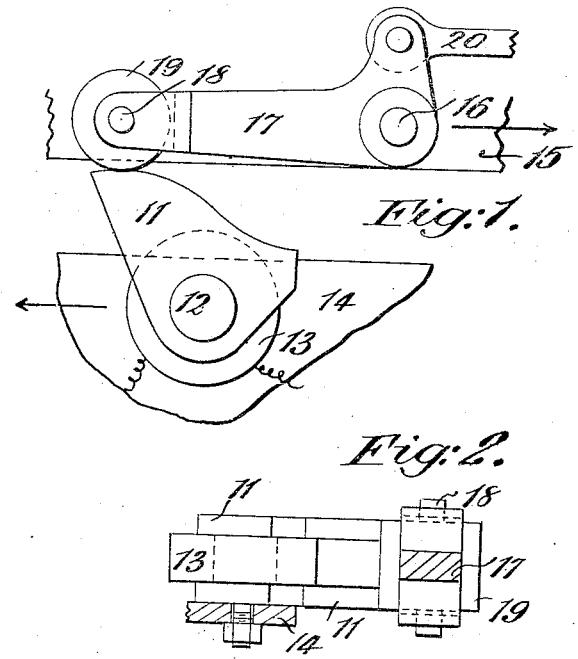

H. A. COX, G. E. LLOYD & H. E. OSBORNE.
MEANS FOR OPERATING A MOVABLE MEMBER IN A MECHANISM BY A PASSING BODY.
APPLICATION FILED JUNE 15, 1915.

1,246,238.

Patented Nov. 13, 1917.

Witnesses:
Chas. E. Whiteman
H. D. Penney

Inventors:
Henry Ashley Cox,
Guy Ernest Lloyd,
Harry Edward Osborne,
By their Atty,
F. H. Richards

UNITED STATES PATENT OFFICE.

HENRY ASHLEY COX AND GUY ERNEST LLOYD, OF SUTTON, AND HARRY EDWARD OSBORNE, OF LONDON, ENGLAND.

MEANS FOR OPERATING A MOVABLE MEMBER IN A MECHANISM BY A PASSING BODY.

1,246,238.  Specification of Letters Patent.  Patented Nov. 13, 1917.

Application filed June 15, 1915. Serial No. 34,268.

*To all whom it may concern:*

Be it known that we, HENRY ASHLEY COX, a subject of the King of Great Britain, residing in Sutton, county of Surrey, England, GUY ERNEST LLOYD, a subject of the King of Great Britain, residing in Sutton, county of Surrey, England, and HARRY EDWARD OSBORNE, a subject of the King of Great Britain, residing in London, England, have invented certain new and useful Improvements in Means for Operating a Movable Member in a Mechanism by a Passing Body, of which the following is a specification.

Our invention relates to means for causing a member movably mounted on a piece of mechanism to be operated by a body which passes it in a set path.

The movable member may be on a fixed or traveling frame, and the coöperating body may be in a traveling or fixed frame or both frames may move if one overtakes or passes the other.

The object of our invention is to provide a simple and sure method of causing the interaction between the movable member and the passing body to depend upon the closing of the energizing circuit of an electro-magnet or a plurality of such, the electro-magnetic connection being made and attraction being established when magnet and armature are in contact or substantially so; and to avoid idle movement of parts when such interaction is not required.

According to the present invention a movable cam-pin or cam is caused to be moved by a passing cam or cam-pin only when an electric circuit is closed, by constructing either the cam or the cam-pin as an electro-magnet and the cam-pin or the cam as a suitable armature, the coil of the electro-magnet being energized when required through any suitable means. The face of the cam which is first reached by the cam pin is preferably located so that they are separated, if at all, by only a working clearance, and if not energized, the cam and cam-pin have no effect upon each other, but if one is energized the cam-pin is drawn to the cam face and follows it, and which ever is transversely movable is caused to move as the profile of the cam determines.

We usually prefer to furnish cam-pins with anti-friction rollers which form the armature or the magnet pole-pieces as the case may be.

In order that the invention may be the better understood drawings are appended illustrating one embodiment of the invention in which Figure 1 is a side elevation, and Fig. 2 is a top-plan partially in section.

In Fig. 1, 15 is the body having a movable member 17 which is to be operated (usually vibratorily) by a body 14 passing it in a set path. The relative motion of the mechanism and body is indicated by the arrows. The reference numerals 11, designate two similar cams forming the pole-pieces of an electro-magnet fixed to 14, 12 being the yoke and 13 being the winding, while 18 is a cam-pin furnished with an anti-friction roller 19, which forms the armature touching both pole-pieces, and so completing the magnetic circuit of 11 and 12. 18 is movably mounted upon 15, usually upon a pivot-pin and connected as may be convenient to the member to be moved, as for example by the pivoted arm 17 and link 20.

When no movement of the member is required no electric current is passed through the winding 13, but when such movement is required in accordance with the relative motion of 15 and 14, a current is passed and then the first of a succession of armatures 19 which may be passing, is attracted to the pole-pieces and follows their profile, which is in the form of a cam to give the exact movement of 18 which is desired corresponding to the relative movement of 15 and 14.

We claim:

1. In a device of the class described, means for operating a movable-member in a mechanism by a passing body comprising a cam and cam-pin either of which is an electro-magnet, the other being its armature.

2. In a device of the class described, means for operating a movable-member in a mechanism by a passing body comprising a cam and cam-pin either of which is an electro-magnet, the other being its armature, and either of which is mounted on the mechanism and connected to the movable-member, the other being mounted on the passing body.

3. In a device of the class described, means for operating a movable-member in a mechanism by a passing body comprising an electro-magnet and its armature, either of which is a cam, the other being its cam-pin, and either of which is mounted in the mechanism and connected to the movable-member, the other being mounted on the passing body.

4. In a device of the class described, means for operating a movable-member in a mechanism by a passing body wherein a member is moved transversely to the path of the passing body by reason of magnetic attraction between a cam on one and a cam-pin on the other.

5. In a device of the class described, means for operating a movable-member in a mechanism by a passing body comprising a cam in the passing body and a cam-pin mounted in the mechanism and connected to the movable-member, one forming the poles and the other the armature of an electro-magnet.

6. In a device of the class described, means for operating a movable-member in a mechanism by a passing body comprising an electro-magnet in the passing body and its armature mounted in the mechanism and connected to the movable-member, one being a cam and the other its cam-pin.

7. In a device of the class described, means for operating a movable-member in a mechanism by a passing body comprising a cam on the passing body forming the poles of an electro-magnet, and a cam-pin forming its armature mounted in the mechanism and connected to the movable-member.

In witness whereof we have hereunto set our hands in the presence of the undermentioned witnesses.

HENRY ASHLEY COX.
GUY ERNEST LLOYD.
HARRY EDWARD OSBORNE.

Witnesses:
JOHN H. JACK,
E. H. HARHERD.

Copies of this patent may be obtained for five cents each, by addressing the "Commissioner of Patents, Washington, D. C."